(12) United States Patent
Qin et al.

(10) Patent No.: US 11,238,381 B2
(45) Date of Patent: Feb. 1, 2022

(54) METHOD AND APPARATUS FOR TALENT-POST MATCHING AND COMPUTER READABLE STORAGE MEDIUM

(71) Applicant: BAIDU ONLINE NETWORK TECHNOLOGY (BEIJING) CO., LTD., Beijing (CN)

(72) Inventors: Chuan Qin, Beijing (CN); Chen Zhu, Beijing (CN); Tong Xu, Beijing (CN); Hengshu Zhu, Beijing (CN); Hui Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 197 days.

(21) Appl. No.: 16/380,779

(22) Filed: Apr. 10, 2019

(65) Prior Publication Data

US 2019/0317966 A1 Oct. 17, 2019

(30) Foreign Application Priority Data

Apr. 12, 2018 (CN) .......................... 201810326101.6

(51) Int. Cl.
*G06Q 10/10* (2012.01)
*G06Q 10/06* (2012.01)
(Continued)

(52) U.S. Cl.
CPC .............. *G06Q 10/063112* (2013.01); *G06F 16/90344* (2019.01); *G06F 16/9536* (2019.01);
(Continued)

(58) Field of Classification Search
CPC .............. G06F 40/30; G06F 16/9536; G06F 16/90344; G06K 9/6257; G06N 3/08;
(Continued)

(56) References Cited

U.S. PATENT DOCUMENTS

2014/0122355 A1 * 5/2014 Hardtke ............... G06Q 10/105
705/321
2017/0228697 A1 * 8/2017 Brdiczka ............ G06Q 10/1053
(Continued)

FOREIGN PATENT DOCUMENTS

CN 105117863 A 12/2015
CN 105159962 A 12/2015
(Continued)

OTHER PUBLICATIONS

A. B. Kmail, M. Maree, M. Belkhatir and S. M. Alhashmi, "An Automatic Online Recruitment System Based on Exploiting Multiple Semantic Resources and Concept-Relatedness Measures," (2015) 2015 IEEE 27th International Conference on Tools with Artificial Intelligence (ICTAI), pp. 620-627 (Year: 2015).*

(Continued)

*Primary Examiner* — David T. Brooks
*Assistant Examiner* — Lana Alagic
(74) *Attorney, Agent, or Firm* — Lathrop GPM LLP (57) ABSTRACT

Embodiments of the disclosure provide a method and an apparatus for talent-post matching, a device and a medium, which relates to the field of information matching and recruitment. The method includes: determining a resume feature representing a resume to be predicted according to a post submitted and the resume to be predicted; and predicting a matching degree between the resume to be predicted and the post by using a pre-trained predictive model according to a post feature of the post and the resume feature. With the method and the apparatus for talent-post matching, the device and the medium provided in embodiments of the present disclosure, the resume and the post may be matched automatically.

7 Claims, 4 Drawing Sheets

(51) Int. Cl.
  *G06F 40/30* (2020.01)
  *G06F 16/9536* (2019.01)
  *G06F 16/903* (2019.01)
  *G06K 9/62* (2006.01)

(52) U.S. Cl.
  CPC ........... *G06F 40/30* (2020.01); *G06K 9/6257* (2013.01); *G06Q 10/1053* (2013.01)

(58) Field of Classification Search
  CPC ........... G06N 3/02; G06N 3/10; G06N 3/105; G06Q 10/1053
  See application file for complete search history.

(56) References Cited

U.S. PATENT DOCUMENTS

| | | | | |
|---|---|---|---|---|
| 2019/0019160 | A1* | 1/2019 | Champaneria | G06F 40/30 |
| 2019/0034792 | A1* | 1/2019 | Kataria | G06Q 10/1053 |
| 2019/0102704 | A1* | 4/2019 | Liu | G06Q 10/1053 |
| 2019/0108217 | A1* | 4/2019 | Chen | G06F 40/35 |
| 2019/0220824 | A1* | 7/2019 | Liu | G06Q 10/1053 |

FOREIGN PATENT DOCUMENTS

| | | |
|---|---|---|
| CN | 106777296 A | 5/2017 |
| CN | 107590133 A | 1/2018 |
| CN | 107729532 A | 2/2018 |

OTHER PUBLICATIONS

Liu, Bang & Zhang, Ting & Niu, Di & Lin, Jinghong & Lai, Kunfeng & Xu, Yu. Matching Long Text Documents via Graph Convolutional Networks. (Feb. 2018). arXiv preprint arXiv: 1802.07459, 2793-2799. (Year: 2018).*

Chinese Patent Application No. 201810326101.6 Office Action dated Sep. 18, 2021, 11 pages.

Chinese Patent Application No. 201810326101.6 English translation of Office Action dated Sep. 18, 2021, 15 pages.

* cited by examiner

METHOD AND APPARATUS FOR TALENT-POST MATCHING AND COMPUTER READABLE STORAGE MEDIUM

CROSS-REFERENCE TO RELATED APPLICATION

The present application is based upon and claims priority to Chinese Patent Application No. 201810326101.6, filed on Apr. 12, 2018, the entire contents of which are incorporated herein by reference.

FIELD

Embodiments of the present disclosure relate to the field of information matching and recruitment, and in particular, to a method and an apparatus for talent-post matching and a computer readable storage medium.

BACKGROUND

Recruitment is an important part of enterprise development. According to the actual needs of enterprise development, various scientific selection techniques are used to select suitable candidates for different posts (job positions) to achieve the best match among talents, positions and organizations, such that goals of assigning personnel to suitable posts according to their talents may be achieved.

At present, the talent-post matching is generally performed by the HR specialists screening the submitted resumes according to the post requirements.

There are several problems existing in the prior art: since the number of resumes delivered for each post is large, it is necessary to pay a large amount of labor cost to screen the resumes, resulting in a problem of high labor costs. Moreover, screening of the resumes depends to a great extent on the HR specialists' subjectivity, which leads to serious subjective problems of the screened results.

SUMMARY

Embodiments of the present disclosure provide a method and an apparatus for talent-post matching and a computer readable storage medium.

Embodiments of the present disclosure provide a method for talent-post matching. The method may include: determining a resume feature representing a resume to be predicted according to a post and the resume to be predicted; and predicting, according to a post feature of the post and the resume feature, a matching degree between the resume to be predicted and the post by using a pre-trained predictive model.

Embodiments of the present disclosure provide an apparatus for talent-post matching. The apparatus may include: one or more processors; a storage device for storing one or more programs; in which when the one or more programs are executed by the one or more processors, the one or more processors are caused to: determine a resume feature representing a resume to be predicted according to a post and the resume to be predicted; and predict, according to a post feature of the post and the resume feature, a matching degree between the resume to be predicted and the post by using a pre-trained predictive model.

Embodiments of the present disclosure provide a computer readable storage medium having stored thereon a computer program, in which when the computer program is executed by a processor, the method for talent-post matching according to any of embodiments of the present disclosure.

With embodiments of the present disclosure, a resume feature representing a resume to be predicted is determined according to a post and the resume to be predicted, such that the resume feature may be combined with a post requirement and the resume feature corresponding to related talents may be generated, in which the related talents correspond to the post requirement. After that, a matching degree between the resume to be predicted and the post is predicted by using a pre-trained predictive model according to a post feature of the post and the resume feature. Therefore, the matching degree of the resume and the related talents corresponding to the post requirements may be improved, thereby improving the predicting accuracy of the resume and the post.

DETAILED DESCRIPTION

The present disclosure will be further described in detail below with reference to the accompanying drawings and embodiments. It may be understood that the specific embodiments described herein are merely illustrative for the present disclosure and should not be intended to limit the present disclosure. It should also be noted that, for the convenience of description, only some but not all of the structures related to the present disclosure are shown in the drawings.

Embodiment 1

Figure 1:
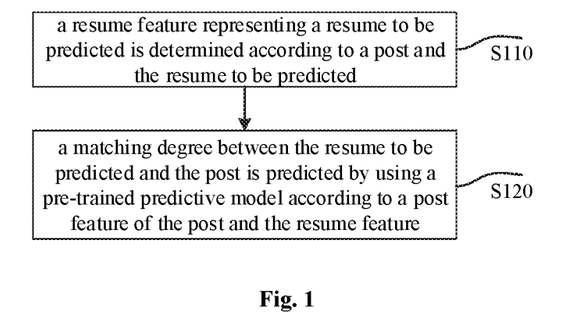
FIG. 1 is a flowchart of a method for talent-post matching according to Embodiment 1 of the present disclosure.

FIG. 1 is a flowchart of a method for talent-post matching according to Embodiment 1 of the present disclosure. This embodiment may be applied to a case of predicting a degree of matching a resume with a posted post (the post in the resume), and may be typically applied to a situation of HR (Human Resources) screening resumes. The method may be performed by an apparatus for talent-post matching, in which the apparatus may be implemented by software and/or hardware. Referring to FIG. 1, the method for talent-post matching provided in this embodiment includes the following.

At block S110, a resume feature representing a resume to be predicted is determined according to a post and the resume to be predicted.

The post includes post information which is information related to post requirements in a text form or a non-text form. The resume to be predicted is a resume that is submitted for the post and needs to be screened. The resume feature is a feature representing the resume to be predicted. Specifically, the resume feature is key information of a relevant ability in the resume to be predicted corresponding to a post requirement.

Alternatively, the resume feature may be key information of a relevant ability in the resume to be predicted requested for all posts; or may be key information of a relevant ability in the resume to be predicted requested for a part of posts; or may be key information of a relevant ability in the resume to be predicted requested for a specific post. In addition, this feature may be in any form. Typically, for a sample, this feature may be a vector. In order to represent more information (to make the semantic space more complete), the feature may be a high dimensional vector. If multiple samples are to be represented, the feature may be a matrix. In order to represent more information, the feature may be a high dimensional matrix.

Specifically, according to the submitted post and the resume to be predicted, the manner of determining the resume feature of the resume to be predicted may include: firstly, determining a feature of the post and a feature of the resume according to the submitted post and the resume to be predicted; and determining the resume feature according to the feature of the post and the feature of the resume.

Alternatively, the manner of determining the resume feature of the resume to be predicted may also include: performing a segmentation on a text of the post and a text of the resume to be predicted; and determining a notional word existing in both of the resume to be predicted and the post submitted as the resume feature representing the resume to be predicted.

At block S120, a matching degree between the resume to be predicted and the post is predicted by using a pre-trained predictive model according to a post feature of the post and the resume feature.

The post feature is a feature representing a post requirement. Alternatively, the post feature may be a feature representing all post requirements; or may be a feature representing a part of the posts; or may be a feature representing a certain post.

The predictive model is pre-trained and is configured to predict the matching degree between the resume to be predicted and the post according to the post feature and the resume feature. The model may be determined by machine learning or by deep learning.

With the technical solution of the embodiment of the present disclosure, a resume feature representing a resume to be predicted is determined according to a submitted post and the resume to be predicted, such that the resume feature and the post requirement may be combined, and the resume feature for a relevant ability may be generated, in which the relevant ability corresponds to a post requirement. After that, a matching degree between the resume to be predicted and the post is predicted by using a pre-trained predictive model according to a post feature of the post and the resume feature, such that the matching degree of the related ability in the resume corresponding to the post requirement may be improved, thereby improving the prediction accuracy of the resume and the post.

Further, before the matching degree between the resume to be predicted and the post is predicted by using the pre-trained predictive model according to the post feature of the post and the resume feature, the method also includes: determining a post to be trained and a resume to be trained as training samples; and training the predictive model according to the training samples.

Specifically, determining the post to be trained and the resume to be trained as the training samples includes: a post to be trained and a resume to be trained are determined as a training sample.

It may be understood that the post data and the resume data are converted into a same feature space by combining the post and the resume as a training sample, thereby facilitating the comparison of the features of the post and the resume.

Embodiment 2

Figure 2:
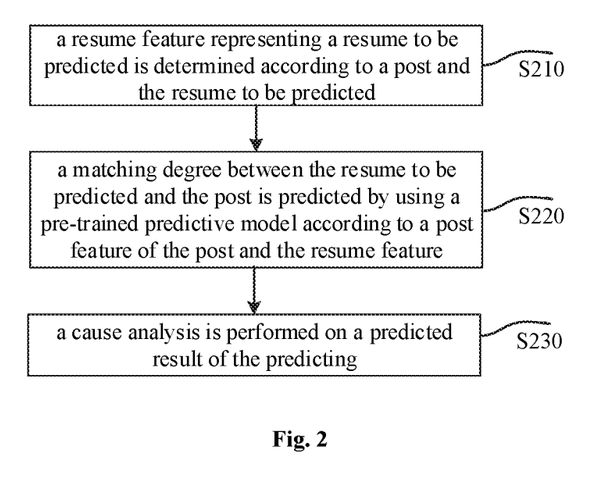
FIG. 2 is a flowchart of a method for talent-post matching according to Embodiment 2 of the present disclosure.

FIG. 2 is a flowchart of a method for talent-post matching according to Embodiment 2 of the present disclosure. This embodiment is an alternative solution proposed on the basis of the above embodiment. Referring to FIG. 2, the method for talent-post matching provided in this embodiment includes the following.

At block S210, a resume feature representing a resume to be predicted is determined according to a post and the resume to be predicted.

At block S220, a matching degree between the resume to be predicted and the post is predicted by using a pre-trained predictive model according to a post feature of the post and the resume feature.

At block S230, a cause analysis is performed on a predicted result of the predicting.

The cause analysis performed on the predicted result of the predicting includes at least one of: analyzing the reason for the success of the resume matching; analyzing the reason for the failure of the resume matching; and analyzing the post requirement of the post of which the matching degree satisfies a set condition.

Specifically, performing the cause analysis on the predicted result of the predicting includes: distinctively displaying, in a text of the post, a word or a sentence corresponding to a sub-feature of which the matching degree satisfies a set post matching condition in the post feature according to the matching degree; and/or, distinctively displaying, in a text of the resume to be predicted, a word or a sentence corresponding to a sub-feature of which the matching degree satisfies a set post matching condition in the post feature according to the matching degree.

It may be understood that, by distinctively displaying key contents in the resume or key contents of the post based on the matching degree, the HR (Human Resources) may view the key information or the relevant ability with a high matching degree from the resume which is distinctively displayed. At the same time, HR may also view the post requirement of a post which is distinctively displayed and has a high (or low) matching degree. In addition, HR may quickly read the resume by viewing key contents in the resume.

With the technical solution of the embodiment of the present disclosure, it is helpful for HR to understand the predicted result by performing the cause analysis on the predicted result.

Embodiment 3

Figure 3:
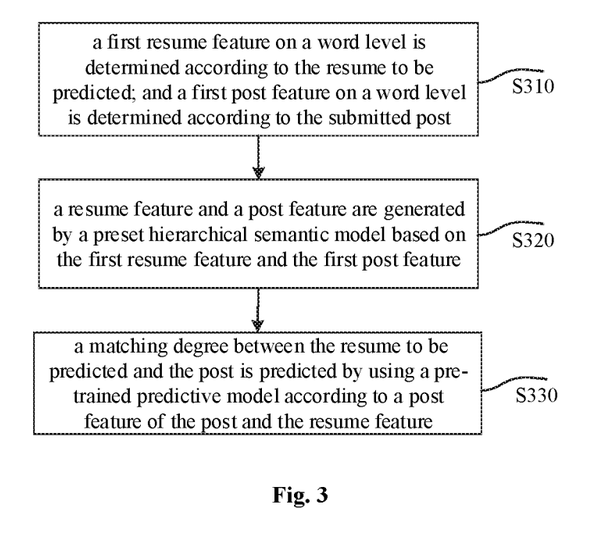
FIG. 3 is a flowchart of a method for talent-post matching according to Embodiment 3 of the present disclosure.

FIG. 3 is a flowchart of a method for talent-post matching according to Embodiment 3 of the present disclosure. This embodiment is an alternative solution provided on the basis of the above embodiments, in which a deep learning model is taken as an example. Referring to FIG. 3, the method for talent-post matching provided in this embodiment includes the following.

At block S310, a first resume feature on a word level is determined according to the resume to be predicted; and a first post feature on a word level is determined according to the submitted post.

Specifically, the first resume feature and the first post feature may be determined by extracting basic semantic features of the post text data and the resume text data. Thereby, the post text data and the resume text data are converted into a semantic feature space on a word level.

The semantic feature is a concept in semantics, which refers to a characteristic of the meaning of a certain word.

Alternatively, a basic semantic feature representation method includes but is not limited to the following methods: a word representation method based on a bag-of-words model; a word vector representation method based on word to vector; a semantic feature representation method based on a deep neural network (including a series of variant models of a convolutional neural network (CNN) and a time recurrent neural network (RNN)).

Typically, a semantic feature representation method of BiLS™ (a time recurrent neural network based on bidirectional long/short term memory) is used in this embodiment.

At block S320, a resume feature and a post feature are generated by a preset hierarchical semantic model based on the first resume feature and the first post feature.

The hierarchical semantic model needs to be obtained through deep learning in advance.

At block S330, a matching degree between the resume to be predicted and the post is predicted by using a pre-trained predictive model according to a post feature of the post and the resume feature.

With the technical solution of the embodiment of the present disclosure, the resume feature and the post feature are generated by using the preset hierarchical semantic model based on the first resume feature and the first post feature, thereby achieving a deep mining of the resume and the post feature, thereby improving the prediction accuracy of the resume to be predicted and the post matching degree.

Embodiment 4

Figure 4:
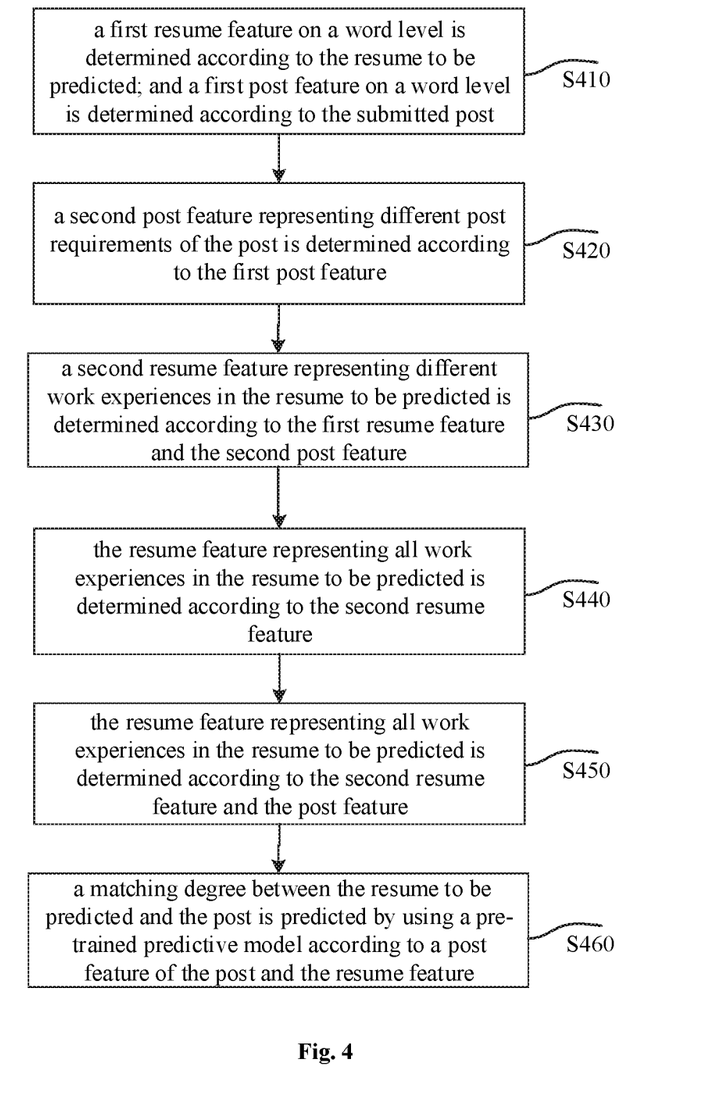
FIG. 4 is a flowchart of a method for talent-post matching according to Embodiment 4 of the present disclosure.

FIG. 4 is a flowchart of a method for talent-post matching according to Embodiment 4 of the present disclosure. This embodiment is specific to the act in block S320 on the basis of the above embodiments. Referring to FIG. 4, the method for talent-post matching provided in this embodiment includes the following.

At block S410, a first resume feature on a word level is determined according to the resume to be predicted; and a first post feature on a word level is determined according to the submitted post.

At block S420, a second post feature representing different post requirements of the post is determined according to the first post feature.

The second post feature represents key information in a post requirement.

Typically, the second post feature may be determined based on an attention mechanism and according to the first post feature. Specifically, the post requirement is represented as a semantic vector based on the attention mechanism and according to the first post feature; and the semantic vector is determined as the second post feature.

It should be noted that the attention mechanism is essentially similar to the human selective visual attention mechanism, of which the core goal is to select information that is more critical to the current mission objectives from a variety of information.

The goal of the attention mechanism here is to select the key information that represents the requirements of the post from a post requirement. The critical degree of the information may be reflected by different weights.

Specifically, different weights may be set for the first post feature based on the attention mechanism. The second post feature may be in a form of associating with a plurality of first post features with different weights.

At block S430, a second resume feature representing different work experiences in the resume to be predicted is determined according to the first resume feature and the second post feature.

The second resume feature represents key information in a work experience for different ability requirements.

Typically, the second resume feature may be determined by combining with the second post feature, based on the attention mechanism and according to the first resume feature.

The goal of the attention mechanism here is to select key information that represents different ability requirements from a work experience for different ability requirement.

Specifically, different weights may be set for different features in the first resume feature according to a matching degree of the features in the first resume feature and the second post feature; and a second resume feature is determined based on the weights and according to different features in the first resume feature.

Specifically, determining the second resume feature based on the weights and according to different features in the first resume feature may include: determining a feature of which the weight is greater than a set weight threshold in the first resume feature as the second resume feature.

Alternatively, determining the second resume feature based on the weights and according to the different features in the first resume feature may further include: associating different features in the first resume feature according to the weights, and determining the associated feature as the second resume feature.

At block S440, the resume feature representing all work experiences in the resume to be predicted is determined according to the second resume feature.

Typically, depending on the importance of different abilities in the post requirement, a new attention mechanism is used to represent all post requirements for the post as a post feature. The post feature may be a semantic vector.

Specifically, different weights may be set for the second post feature according to the importance of different post requirements. The post feature is generated by associating the second post feature corresponding to all post requirements based on the weights.

For example, for the algorithm research and development post, a requirement of the C language in a first post requirement is "mastered"; a requirement of the MATLAB programming language in a second post requirement is "understood". It can be seen that the importance of the first post requirement is greater than the second post requirement. Therefore, a first weight is set for a second post feature corresponding to the first post requirement. A second weight is set for a second post feature corresponding to a second post requirement (the first weight is greater than the second weight). The second post features set with weights are then added as the post feature.

It should be noted that, in this embodiment, the execution acts in blocks S430 and S440 are not limited. Typically, act in block S440 may be performed before act in block S430.

At block S450, the resume feature representing all work experiences in the resume to be predicted is determined according to the second resume feature and the post feature.

Typically, the serialization information in the second resume feature is extracted according to a time series feature in the work experience, and all work experiences in the resume are represented into the resume feature for different abilities using the new attention mechanism in combination with the post feature. The resume feature may be a semantic vector.

The time series features in the work experience are chronological features of different work experiences.

At block S460, a matching degree between the resume to be predicted and the post is predicted by using a pre-trained predictive model according to a post feature of the post and the resume feature.

The method for talent-post matching provided in this embodiment may be implemented by deep learning. Specifically, each of the above acts is taken as a layer structure in the deep learning model. Before the predicting process mentioned above, it is necessary to train the deep learning model with a large amount of sample data. In addition, features may be selected automatically in the deep learning, such that the inconvenience of specifying features manually may be avoided.

Figure 5:
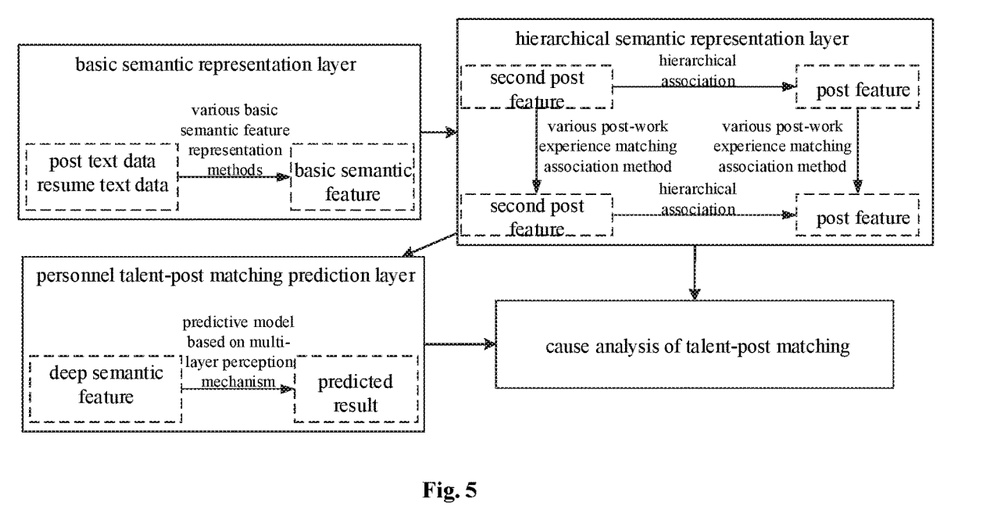
FIG. 5 is a flowchart of training a deep learning model by using a large amount of sample data according to Embodiment 4 of the present disclosure.

Referring to FIG. 5, in practical applications, training the deep learning model with a large amount of sample data may be described as follows.

1) The basic semantic features of the post text data and the resume text data are extracted using a semantic feature representation method of BiLSTM to obtain the first post feature and the first resume feature on the word level.

2) A hierarchical semantic modeling is performed on the post and the resume using a semantic representation method based on an ability-perceiving multiple attention mechanism, and multiple text association methods are supported to perceive matching causes from different levels, which specifically includes following.

(1) Based on the attention mechanism and the first post feature, the key semantic information in a certain post requirement is extracted, and a semantic vector representing the post is generated as the second post feature.

(2) Considering significances of different abilities in the post requirement, BiLSTM is used to perform the modeling on the post requirement and serialization information therein is extracted; combining with the serialization information, a new attention mechanism is used to representing all requirements of the post a semantic vector, and the semantic vector is determined as the post feature.

(3) Combining with the second post feature, key information for different ability requirements in a certain work experience is extracted using a new ability-perceiving attention mechanism based on the first resume feature; the key information is represented as an ability-related post requirement semantic vector; and the semantic vector is determined as the second resume feature.

(4) Based on the second resume feature, a mean pooling layer is used to perform a semantic representation on the overall post ability requirements for a single work experience; taking into account the time series features in the work experience, BiLSTM is used to perform a modeling on multiple work experiences; the post features are associated to construct a new attention mechanism model, such that all the work (engineering) experiences in the resume are represented as a semantic vector under multi-ability perception; and the semantic vector is determined as the resume feature.

3) Using the above-mentioned resume features and the above-mentioned post features, a predictive model is constructed based on the multi-layer perception; and the matching prediction is performed based on the model.

4) Based on at least one of the first post feature, the second post feature, the post feature, the first resume feature, the second resume feature, and the resume feature, the reason of the result is analyzed and displayed.

The beneficial effects of the above method include: high efficiency, accuracy and interpretability. The above solution is an end-to-end talent-post matching model, such that the deep semantic features in the recruitment data may be automatically mined without human intervention, thereby improving the talent-post matching efficiency and reducing the labor costs. Moreover, the above solution supports the deep learning technology, such that the model has better fitting ability when there are massive human resource data. Furthermore, the above solution may analyze the reason of the matching result of the resume and post, such that the HR may understand the reason why the model determines whether the resume is suitable for a particular post.

The technical solution of the embodiment of the present disclosure considers that the company lists the requirements for the ability of the job seeker when posting the post information, and the HR cares about the information reflecting the ability of the job seeker in the work (engineering) experience. Therefore, through a multi-layer semantic analysis, the deep semantic features reflecting the ability in the post text and resume text are mined, such that the accuracy of resume and post matching may be improved.

It should be noted that, through the technical teaching of the embodiment, those skilled in the art have the motivation to combine the solution of any of the implementations described in the foregoing embodiments to perform the analysis of the talent-post matching.

Embodiment 5

Figure 6:
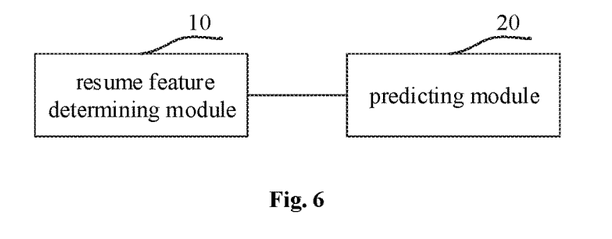
FIG. 6 is a schematic structural diagram of an apparatus for talent-post matching according to Embodiment 5 of the present disclosure.

FIG. 6 is a schematic structural diagram of an apparatus for talent-post matching according to Embodiment 5 of the present disclosure. Referring to FIG. 6, the apparatus for talent-post matching provided in this embodiment includes a resume feature determining module 10 and a predicting module 20.

The resume feature determining module 10 is configured to determine a resume feature representing a resume to be predicted according to a post and the resume to be predicted.

The predicting module 20 is configured to predict, according to a post feature of the post and the resume feature, a matching degree between the resume to be predicted and the post by using a pre-trained predictive model.

With the technical solution of the embodiment of the present disclosure, a resume feature representing a resume to be predicted is determined according to a submitted post and the resume to be predicted, such that the resume feature and the post requirement may be combined, and the resume features for relevant abilities may be generated, in which the relevant abilities correspond to the post requirements. After that, a matching degree between the resume to be predicted and the post is predicted by using a pre-trained predictive model according to a post feature of the post and the resume feature, such that the matching degree of the related ability in the resume corresponding to the post requirement may be improved, thereby improving the prediction accuracy of the resume and the post.

Further, the human-person matching analysis device further includes: a reason analyzing module.

The reason analysis module is configured to: perform a cause analysis on a predicted result of the predicting after the matching degree between the resume to be predicted and the post is predicted by using the pre-trained predictive model according to the post feature of the post and the resume feature.

Further, the reason analyzing module includes: a post displaying unit and a resume displaying unit.

The post displaying unit is configured to distinctively display, in a text of the post, a word or a sentence corresponding to a sub-feature of which the matching degree satisfies a set post matching condition in the post feature according to the matching degree; and/or, the resume displaying unit is configured to distinctively display, in a text of the resume to be predicted, a word or a sentence corresponding to a sub-feature of which the matching degree satisfies a set post matching condition in the post feature according to the matching degree.

Further, the apparatus further includes: a sample combining module and a training module.

The sample combining module is configured to: determine a post to be trained and a resume to be trained as training samples before the matching degree between the resume to be predicted and the post is predicted by using the pre-trained predictive model according to the post feature of the post and the resume feature.

The training module is configured to train the predictive model according to the training samples.

Further, the apparatus also includes: a first post module and a post feature module.

The first post module is configured to: a first post feature on a word level is determined according to the post before the matching degree between the resume to be predicted and the post is predicted by using the pre-trained predictive model according to the post feature of the post and the resume feature.

The post feature module is configured to determine, according to the first post feature, a post feature representing all post requirements of the post.

Further, the post feature module includes: a second post unit and a post feature unit.

The second post unit is configured to determine, according to the first post feature, a second post feature representing different post requirements of the post.

The post feature unit is configured to determine, according to the second post feature, a post feature representing all post requirements of the post.

Further, the resume feature determining module includes: a first resume unit, a second resume unit, and a resume feature unit.

The first resume unit is configured to determine a first resume feature on a word level according to the resume to be predicted.

The second resume unit is configured to determine a second resume feature representing different work experiences in the resume to be predicted according to the first resume feature and the second post feature.

The resume feature unit is configured to determine the resume feature representing all work experiences in the resume to be predicted according to the second resume feature.

Further, the resume feature unit is specifically configured to determine the resume feature according to the second resume feature and the post feature.

Embodiment 6

Figure 7:
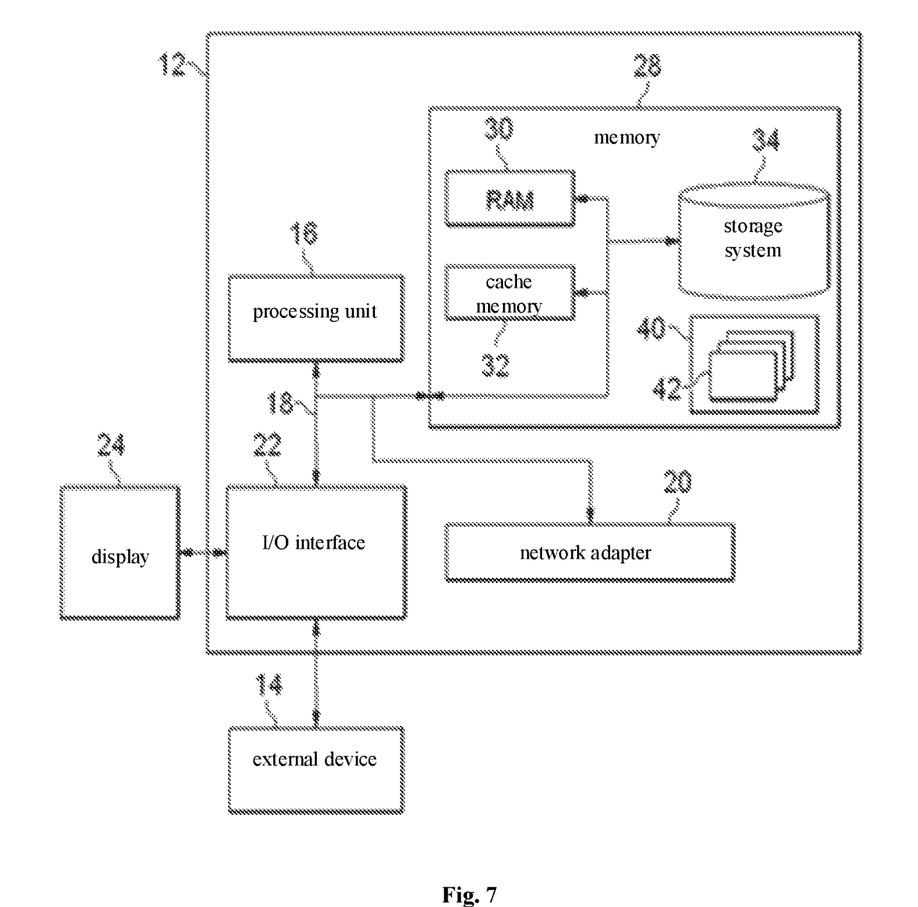
FIG. 7 is a schematic structural diagram of a device according to Embodiment 6 of the present disclosure.

FIG. 7 is a schematic structural diagram of a device according to Embodiment 6 of the present disclosure. FIG. 7 illustrates a block diagram of an exemplary device 12 suitable for implementing embodiments of the present disclosure. The device 12 illustrated in FIG. 7 is merely an example and should not impose any limitation on the function and scope of embodiments of the present disclosure.

As illustrated in FIG. 7, the device 12 is implemented in a form of a general purpose computing device. Components of the device 12 may include, but are not limited to, one or more processors or processing units 16, a system memory 28, and a bus 18 connecting different system components including the system memory 28 and the processing unit 16.

The bus 18 represents one or more of a variety of bus structures, including a memory bus or a memory controller, a peripheral bus, a graphics acceleration port, a processor, or a local bus using any of a variety of bus structures. For example, these architectures include, but are not limited to, Industry Standard Architecture (ISA) buses, Micro Channel Architecture (MAC) buses, enhanced ISA buses, Video Electronics Standards Association (VESA) local buses, and Peripheral Component Interconnects (PCI) buses.

The device 12 typically includes a variety of computer system readable mediums. These mediums may be any available medium that may be accessed by the device 12, including volatile and non-volatile mediums, removable and non-removable mediums.

The system memory 28 may include a computer system readable medium in a form of a volatile memory, such as a random access memory (RAM) 30 and/or a cache memory 32. The device 12 may also include other removable/non-removable, volatile/non-volatile computer system storage mediums. As merely an example, the storage system 34 may be configured to read and write non-removable, non-volatile magnetic medium (not shown in FIG. 7, commonly referred to as a hard disk drive). Although not shown in FIG. 7, a disk drive configured to read and write on a removable non-volatile disk (such as a floppy disk), and an optical drive configured to read and write on a removable non-volatile disk (such as a CD-ROM, DVD-ROM or other optical mediums) may be provided. In these cases, each drive may be connected to the bus 18 via one or more data medium interfaces. The memory 28 may include at least one program product having a set (e.g., at least one) of program modules configured to perform the functions of embodiments of the present disclosure.

A program/utility 40 having a set (at least one) of program modules 42 may be stored, for example, in the memory 28, such program modules 42 include but are not limited to operating systems, one or more applications, other program modules, and program data. An implementation of a network environment may be included in each or some of these examples. The program module 42 typically performs the functions and/or methods of the described embodiments of the present disclosure.

The device 12 may be also configured to communicate with one or more external devices 14 (e.g., a keyboard, a pointing device, a display 24, etc.), and to communicate with one or more devices that enable a user to interact with the device 12, and/or to communicate with any device (e.g., a network card, a modem, etc.) that enables the device 12 to communicate with one or more other computing devices. Such communications may take place via an input/output (I/O) interface 22. The device 12 may also communicate with one or more networks (e.g., a local area network (LAN), a wide area network (WAN), and/or a public network, such as the Internet) via a network adapter 20. As shown, the network adapter 20 communicates with other modules of the device 12 via the bus 18. It should be understood that although not shown in the figures, other hardware and/or software modules, including but not limited to microcode, device drivers, redundant processing units, external disk drive arrays, RAID systems, tape drives, and data backup storage systems, etc., may be utilized in connection with the device 12.

The processing unit 16 performs, by running a program stored in the system memory 28, various function applications and data processing, for example, the method for talent-post matching provided in embodiments of the present disclosure.

Example 7

The embodiment 7 of the present disclosure also provides a computer readable storage medium, having stored thereon a computer program, in which when the program is executed by a processor, the methods for talent-post matching according to embodiments of the present disclosure are implemented.

The computer storage medium of the embodiments of the present disclosure may employ any combination of one or more computer readable mediums. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination thereof. More specific examples (non-exhaustive lists) of computer readable storage medium include: ab electrical connections having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. The computer readable storage medium may be any tangible medium that may contain or store a program herein, in which the program may be used by or in connection with an instruction execution system, apparatus, or device.

A computer readable signal medium may be included in a baseband or as a data signal that is propagated in the baseband or as part of a carrier, which carries computer readable program code. Such propagated data signal may employ a variety of forms including, but not limited to, an electromagnetic signal, an optical signal, or any suitable combination thereof. The computer readable signal medium may also be any computer readable medium other than a computer readable storage medium, which may transmit, propagate, or transport a program configured to be used by or in connection with an instruction execution system, apparatus, or device.

The program code embodied on the computer readable medium may be transmitted by any suitable medium, including but not limited to wireless, wire, optical cable, RF, etc., or any suitable combination thereof.

The computer program code configured to implement operations of the present disclosure may be written in one or more programming languages, or combinations thereof. The programming languages include an object oriented programming language such as Java, Smalltalk, C++, and also include conventional procedural programming language such as C language or a similar programming language. The program code may be executed entirely on the user's computer, partly on the user's computer, as an independent software package, partly on the user's computer and partly on a remote computer, or entirely on the remote computer or a server. In the case of the remote computer, the remote computer may be connected to the user's computer via any kind of network, including a local area network (LAN) or wide area network (WAN), or may be connected to an external computer (e.g., via Internet connection using an Internet service provider).

It should be noted that the preferred embodiments of the present disclosure and the technical principles applied thereto are merely described above. Those skilled in the art will appreciate that the present disclosure is not limited to the specific embodiments described herein, and that various modifications, changes and substitutions may be made by those skilled in the art without departing from the scope of the present disclosure. Therefore, although the present disclosure has been described in detail in the above embodiments, the present disclosure is not limited to the above embodiments, and other equivalent embodiments may be included without departing from the inventive concept. The scope of the present disclosure is determined by the scope of the appended claims.

What is claimed is:

1. A method for talent-post matching, comprising:
   determining a first resume feature on a word level according to a resume to be predicted;
   determining a first post feature on a word level according to a post;
   determining a second post feature by associating features in the first post feature with a plurality of first weights;
   determining a post feature by adding up a plurality of second post features of the post set with a plurality of second weights;
   setting a plurality of third weights for features in the first resume feature according to a matching degree of the features in the first resume feature and the second post feature, associating the features in the first resume feature with the plurality of third weights, and determining the associated features as a second resume feature, in which the second resume feature represents a work experience in the resume to be predicted;
   determining a resume feature representing all work experiences in the resume to be predicted according to the second resume feature and the post feature; and
   predicting, according to the post feature of the post and the resume feature, a matching degree between the resume to be predicted and the post by using a pre-trained predictive model which is trained according to training samples, the training samples comprising posts and resumes to be trained.

2. The method according to claim 1, wherein after predicting, according to the post feature of the post and the resume feature, the matching degree between the resume to be predicted and the post by using the pre-trained predictive model, the method further comprises:
   performing a cause analysis on a predicted result of said predicted matching degree.

3. The method according to claim 2, wherein performing the cause analysis on the predicted result of said predicted matching degree comprises at least one of:
   distinctively displaying, in a text of the post, a word or a sentence corresponding to a sub-feature in the post feature according to the matching degree, the matching degree of the sub-feature in the post feature satisfying a preset post matching condition; and
   distinctively displaying, in a text of the resume to be predicted, a word or a sentence corresponding to a sub-feature in the resume feature according to the matching degree, the matching degree of the sub-feature in the resume feature satisfying a preset resume matching condition.

4. An apparatus for talent-post matching, comprising:
one or more processors;
a storage device for storing one or more programs;
wherein when the one or more programs are executed by the one or more processors, the one or more processors are caused to:
determine a first resume feature on a word level according to a resume to be predicted;
determine a first post feature on a word level according to a post;
determine a second post feature by associating features in the first post feature with a plurality of first weights;
determine a post feature by adding up a plurality of second post features of the post set with a plurality of second weights;
set a plurality of third weights for features in the first resume feature according to a matching degree of the features in the first resume feature and the second post feature, associate the features in the first resume feature with the plurality of third weights, and determine the associated features as a second resume feature, in which the second resume feature represents a work experience in the resume to be predicted;
determine a resume feature representing all work experiences in the resume to be predicted according to the second resume feature and the post feature; and
predict, according to the post feature of the post and the resume feature, a matching degree between the resume to be predicted and the post by using a pre-trained predictive model which is trained according to training samples, the training samples comprising posts and resumes to be trained.

5. The apparatus according to claim 4, wherein after the one or more processors predict, according to the post feature of the post and the resume feature, the matching degree between the resume to be predicted and the post by using the pre-trained predictive model, the one or more processors are configured to:
perform a cause analysis on a predicted result of said predicted matching degree.

6. The apparatus according to claim 5, wherein the one or more processors perform the cause analysis on the predicted result of said predicted matching degree by performing at least one of:
distinctively displaying, in a text of the post, a word or a sentence corresponding to a sub-feature in the post feature according to the matching degree, the matching degree of the sub-feature in the post feature satisfying a preset post matching condition; and/or,
distinctively displaying, in a text of the resume to be predicted, a word or a sentence corresponding to a sub-feature in the resume feature according to the matching degree, the matching degree of the sub-feature in the resume feature satisfying a preset resume matching condition.

7. A non-transitory computer readable storage medium having stored thereon a computer program, wherein when the computer program is executed by a processor, the processor is cause to:
determine a first resume feature on a word level according to a resume to be predicted;
determine a first post feature on a word level according to a post;
determine a second post feature by associating features in the first post feature set with a plurality of first weights;
determine a post feature by adding up a plurality of second post features of the post set with a plurality of second weights;
set a plurality of third weights for features in the first resume feature according to a matching degree of the features in the first resume feature and the second post feature, associate the features in the first resume feature with the plurality of third weights, and determine the associated features as a second resume feature, in which the second resume feature represents a work experience in the resume to be predicted;
determine a resume feature representing all work experiences in the resume to be predicted according to the second resume feature and the post feature; and
predict, according to the post feature of the post and the resume feature, a matching degree between the resume to be predicted and the post by using a pre-trained predictive model which is trained according to training samples, the training samples comprising posts and resumes to be trained.

\* \* \* \* \*